United States Patent
Hellmich et al.

(10) Patent No.: US 9,304,307 B2
(45) Date of Patent: Apr. 5, 2016

(54) LIGHT SCANNING MICROSCOPE AND MICROSCOPY METHOD

(71) Applicants: Wibke Hellmich, Jena (DE); Gerhard Krampert, Jena (DE); Matthias Langhorst, Hameln (DE); Ralf Netz, Jena (DE)

(72) Inventors: Wibke Hellmich, Jena (DE); Gerhard Krampert, Jena (DE); Matthias Langhorst, Hameln (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 217 days.

(21) Appl. No.: 13/902,763

(22) Filed: May 24, 2013

(65) Prior Publication Data

US 2013/0314758 A1   Nov. 28, 2013

(30) Foreign Application Priority Data

Mar. 25, 2012   (DE) .......................... 10 2012 208 869

(51) Int. Cl.
*G02B 26/02* (2006.01)
*G02B 21/00* (2006.01)

(52) U.S. Cl.
CPC .......... *G02B 21/0044* (2013.01); *G02B 21/008* (2013.01); *G02B 21/0052* (2013.01)

(58) Field of Classification Search
CPC .................................. G02B 21/0024–21/0084
See application file for complete search history.

(56) References Cited

U.S. PATENT DOCUMENTS

| | | | |
|---|---|---|---|
| 4,742,236 A * | 5/1988 | Kawakami et al. | ........... 250/554 |
| 6,144,489 A | 11/2000 | Wilson et al. | |
| 6,545,265 B1 | 4/2003 | Czarnetzki et al. | |
| 6,687,052 B1 | 2/2004 | Wilson et al. | |
| 2009/0052021 A1 * | 2/2009 | Mogami et al. | ............... 359/385 |

FOREIGN PATENT DOCUMENTS

DE    102005035553 A1    2/2007
EP       1424548 A1    6/2004

* cited by examiner

*Primary Examiner* — Thomas K Pham
*Assistant Examiner* — Cara Rakowski
(74) *Attorney, Agent, or Firm* — Skaar Ulbrich Macari, P.A.

(57) ABSTRACT

A light scanning microscope with an illumination module generates several illumination beams and moves them, in each case as a spot, in a predefined region of a sample to excite sample radiation. A detector module for confocal detection of the sample radiation excited by each spot includes a first detector, an imaging lens system, having an optical axis, for imaging the predefined region along an imaging beam path running from the sample as far as the first detector, and a rotatable diaphragm with several pinholes located in a pinhole plane. The diaphragm, upon rotation, may be located at least partially in the imaging beam path for confocal detection. A second detector may be arranged outside of the imaging beam path. A first beam splitter may be arranged in the imaging beam path between the sample and the diaphragm. The beam splitter deflects sample radiation onto the second detector.

18 Claims, 1 Drawing Sheet

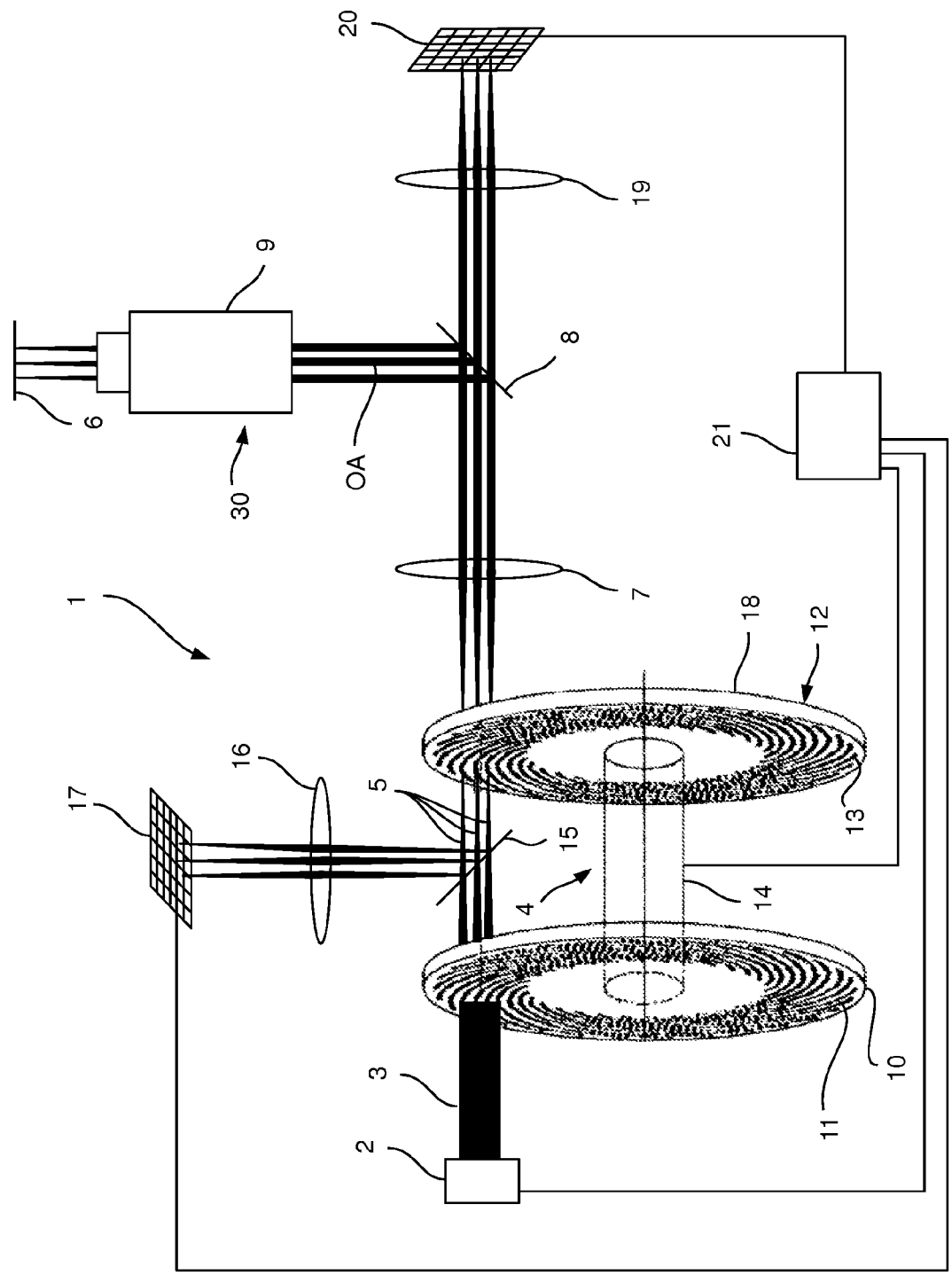

LIGHT SCANNING MICROSCOPE AND MICROSCOPY METHOD

PRIORITY

This application claims priority to German Patent Application No. 102012208869.5, filed on May 25, 2012, which is hereby incorporated herein by reference in its entirety.

FIELD

The present invention relates to a light scanning microscope with an illumination module and to a microscopy method in which several illumination beams are generated.

More particularly, the present invention in certain embodiments relates to a light scanning microscope with an illumination module, which generates several illumination beams and moves them, in each case as a spot, in a predefined region of a sample for the purpose of exciting sample radiation, and a detector module for confocal detection of the sample radiation excited by each spot, wherein the detector module has a first detector, an imaging lens system, having an optical axis, for imaging the predefined region along an imaging beam path running from the sample as far as the first detector, and a rotatable diaphragm with several pinholes which are located in a pinhole plane, wherein the diaphragm, upon rotation, is located at least partially in the imaging beam path for the purpose of confocal detection.

Furthermore, the invention in certain embodiments more particularly relates to a microscopy method in which several illumination beams are generated, each illumination beam is moved, as a spot, in a predefined region of a sample, for the purpose of exciting sample radiation, and the sample radiation excited by each spot is detected confocally by means of a detector module, which has a first detector, an imaging lens system for imaging the predefined region along an imaging beam path running from the sample as far as the detector, and a rotatable diaphragm with several pinholes, wherein the diaphragm, upon rotation, is located at least partially in the imaging beam path for the purpose of confocal detection.

BACKGROUND

For certain light scanning microscopes, the confocal detection is generally optimal only for a predefined pupil diameter of the imaging lens system. Larger or smaller pupil diameters lead to poorer results, or even to loss of signal. Furthermore, if several spots are moved simultaneously in the predefined region of the sample, particularly in the case of thicker samples, there is the effect that a strong background signal occurs, since extrafocal light can pass through the pinholes and is detected. Moreover, disadvantageously, an undesired crosstalk can occur.

SUMMARY

An object of certain embodiments of the invention is to develop a light scanning microscope of the type named at the outset such that the difficulties outlined can be reduced or even eliminated entirely. Furthermore, a microscopy method of the type named at the outset is to be developed in such a manner that the difficulties named above are reduced or even eliminated entirely.

The above-mentioned object is achieved in certain embodiments, in the case of a light scanning microscope of the type named at the outset, in that a second detector is arranged outside of the imaging beam path, and a beam splitter is arranged in the imaging beam path between the sample and the diaphragm, wherein the beam splitter deflects sample radiation, coming from the diaphragm, onto the second detector.

As a result, an additional detection channel is provided for extrafocal sample radiation, which channel can be used to improve the microscope images. The sample radiation coming from the diaphragm is, in particular, sample radiation reflected at the diaphragm. This is thus the sample radiation that is not incident upon a pinhole, but near to it.

The detector module preferably detects the sample radiation transmitted through the pinholes of the diaphragm.

In the case of the light scanning microscope according to certain embodiments of the invention, the pinhole plane can be arranged perpendicular to the optical axis of the imaging lens system. This facilitates adjusting of the optical elements.

Further, a second beam splitter, which effects beam-path folding of the imaging beam path, can be arranged between the diaphragm and the first detector. With this arrangement, it is possible for detection to be performed, by means of the first detector, perpendicular to the optical axis. In particular, the first detector can have a planar detection region, which is perpendicular to the optical axis of the imaging lens system.

The second beam splitter can be located, in particular, on the optical axis. Further, the second beam splitter can be formed as a spectral beam splitter.

In the case of the light scanning microscope according to certain embodiments of the invention, the diaphragm can also be a constituent part of the illumination module, and the rotation of the diaphragm can effect the movement of the spots, wherein the propagation direction of the radiation for generating the illumination beams is preferably perpendicular to the pinhole plane.

Furthermore, the illumination module can have a disk with several imaging elements, the disk can be connected to the diaphragm in a rotationally fixed manner, and each imaging element can be assigned to exactly one pinhole, such that in each case it focuses the illumination beam into the assigned pinhole.

The second beam splitter can be arranged, in particular, between the disk and the diaphragm.

Further, the first beam splitter can be arranged on the optical axis of the imaging lens system. It is thereby possible for the second detector, or its planar detection region, to be aligned parallel to the pinhole plane. This facilitates adjustment of the second detector.

In the case of the light scanning microscope according to the invention, the diaphragm can be formed, in particular, such that the area of the pinholes which are arranged in the part of the diaphragm located in the imaging beam path upon rotation corresponds to not more than 10% of the total area of this part of the diaphragm. In particular, the portion constituted by the pinholes is 5%. This achieves the result, advantageously, that there is a high confocality for detection by means of the first detector.

The first beam splitter is designed, in particular, such that it leaves in the imaging beam path the predominant portion of the radiation that is incident upon it, and couples the remaining portion out of the imaging beam path. The coupled-out portion can be 10% or less.

The side of the diaphragm that faces towards the first beam splitter can be reflective of the sample radiation. A reflective coating, for example, can be applied.

The sample radiation can be, for example, fluorescence radiation, reflected radiation or other radiation excited by the at least one illumination beam.

The illumination module preferably generates several illumination beams.

The spot or spots is/are preferably diffraction-limited and/or punctiform. In principle, linear spots are also possible.

In the case of the light scanning microscope according to the invention, the part of the diaphragm that is arranged, at least partially, in the imaging beam path upon rotation can be positioned in an intermediate image plane of the imaging lens system.

In particular, in the case of the light scanning microscope according to the invention, a detection lens system can be provided which images onto the second detector the part of the diaphragm that is at least partially located in the imaging beam path. As a result, an excellent localized assignment of the detection of the confocal channel (of the detector module) and of the additional detection channel can be effected.

The diaphragm can be formed, in particular, as a Nipkow disk. Furthermore, the illumination module can have a beam shaping unit, which, from a supplied light beam, generates the at least one illumination beam which is focussed into a pinhole of the diaphragm. For this purpose, the beam shaping unit can be realized as a disk which is connected to the diaphragm in a rotationally fixed manner and which has a beam shaping element (e.g. a lens) for each pinhole of the diaphragm. In the case of an illumination light which is stationary relative to the beam shaping unit and which is incident upon the beam shaping unit, a rotation of the beam shaping unit, and therefore also a simultaneous rotation of the diaphragm results in each illumination beam being moved, as a spot, in the predefined region of the sample.

Preferably, several illumination beams are moved simultaneously, as a spot, spaced apart from each other, in the predefined region of the sample.

The detector module can have a further beam splitter between the beam shaping unit and the diaphragm, which beam splitter deflects onto the first detector the sample radiation passing through the pinholes.

In particular, a lens system is provided which images onto the first detector the pinholes that are located in the imaging beam path.

Furthermore, the light scanning microscope according to the invention can have a control unit to which the signals of the two detectors are supplied, and which takes account of the signals in the generation of a sample image. Thus, for the purpose of determining an optical section of the sample, for example, the control unit can perform a scaled subtraction of the signals of the two detectors. Furthermore, additionally or alternatively, for the purpose of determining a widefield image, the control unit can perform a scaled addition of the signals of the two detectors. The subtraction or addition is performed in a scaled manner, in order to take account of the differing detection efficiencies of the two detection channels.

The light scanning microscope according to the invention can be formed, in particular, as a laser scanning microscope.

The two detectors can be formed as a row of detectors or a detector array. In particular, they can be realized as CCD, photomultiplier, avalanche photodiode or CMOS detectors.

The sample can be a constituent part of the light scanning microscope according to the invention.

Furthermore, the light scanning microscope according to the invention can have further elements, known to a person skilled in the art which are necessary for operation of the light scanning microscope.

The object is achieved, in the case of a microscopy method of the type named at the outset, in that a second detector is arranged outside of the imaging beam path, and a beam splitter is arranged in the imaging beam path between the sample and the diaphragm, and the beam splitter deflects sample radiation, coming from the diaphragm, onto the second detector.

An additional detection channel is thus provided for extrafocal light, the measurement signals of which can be taken into account in the image generation process.

In particular, for the purpose of determining an optical section of the sample, a scaled subtraction of the signals of the two detectors can be performed. Furthermore, additionally or alternatively, for the purpose of determining a widefield image, a scaled addition of the signals of the two detectors can be performed.

The microscopy method according to the invention can be developed in the same manner as the light scanning microscope according to the invention. In particular, it can have the method steps specified in connection with the description of the light scanning microscope according to the invention (including the development thereof).

In the same manner, the light scanning microscope according to the invention can be formed such that it can execute the microscopy method according to the invention (including developments thereof).

It is understood that the features mentioned above and those yet to be explained in the following are applicable, not only in the stated combination, but also in other combinations or singly, without departure from the scope of the present invention.

BRIEF DESCRIPTION OF THE DRAWINGS

The invention is explained in further detail below by way of example with reference to the attached drawings which also disclose features essential to the invention.

FIG. 1 is a schematic of a light scanning microscope according to certain embodiments of the invention;

DETAILED DESCRIPTION

The present invention can be explained with reference to the following example embodiments. However, these example embodiments are not intended to limit the present invention to any specific examples, embodiments, environments, applications or implementations described in these embodiments. Therefore, description of these embodiments is only for purpose of illustration rather than to limit the present invention.

FIG. 1 shows schematically an embodiment of a light scanning microscope 1 according to the invention, which comprises a light source 2 that emits a light beam 3, and a deflection unit 4 that divides the light beam 3 into several (e.g. approximately 1000) sub-beams 5 (for greater clarity, only three sub-beams 5 are indicated in FIG. 1) and, in a manner described in more detail in the following, guides it over a sample 6 to be examined. Further, the light scanning microscope 1 comprises a first lens system 7, which is represented schematically as a lens, a beam splitter 8 and an objective 9.

The deflection unit 4 has a first disk 10, with a large number of schematically indicated imaging elements 11, and a second disk 12, with a large number of pinholes 13 which lie in a pinhole plane, wherein the two disks 10, 12 are connected to each other in a rotationally fixed manner via a shaft 14 and are rotatable about the centre axis of the shaft 14.

Each imaging element 11 of the first disk 10 is assigned to exactly one pinhole 13 of the second disk 12, and the imaging elements 11 serve to focus one of the sub-beams 5 from the light beam 3 into the assigned pinhole 13 of the second disk 12. The arrangement of the pinholes 13 on the second disk is selected such that, upon rotation of the two disks 10, 12 about the centre axis of the shaft 14, the generated sub-beams 5 are guided in a predefined region over the sample 6. The second disk 12 can also be referred to as a Nipkow disk, and the deflection unit 4 as a whole can also be referred to as a spinning disk system.

The pinholes 13 through which the sub-beams 5 pass (the propagation direction of which is perpendicular to the pinhole plane) are located in an intermediate image plane for the optical system formed by the first lens system 7 and the objective 9, such that the sub-beams 5 are imaged and moved onto or into the sample 6.

The light scanning microscope according to the invention additionally comprises a beam splitter 15, which is arranged between the two disks 10, 12, a second lens system 16 which is represented schematically as a lens, and a first detector 17. The objective 9, the beam splitter 8, the first lens system 7, the beam splitter 15 and the second lens system 16 together form an imaging lens system 30 which has an optical axis OA (which, in FIG. 1, coincides with the central sub-beam 5), and images the region of the sample 6 to be examined, along an imaging beam path predefined by the elements 9, 8, 7, 15, 17, onto the first detector 17, wherein, basically, a confocal detection is effected on the basis of the pinholes 13 of the second disk 12. For this purpose, the second lens system 16 is formed such that it images the pinholes 13, arranged in the beam path, onto the detector 17.

Thus, a confocal detection of the sample portions illuminated by means of the sub-beams can be performed in a known manner. For example, the sub-beams 5 can excite fluorescence radiation, referred to in the following as sample radiation, which, starting from the sample 6, passes through the objective 9, via the beam splitter 8 and the first lens system 7, and is incident upon the second disk 12. It is thus substantially only the confocal portion of the sample radiation which can pass through the corresponding pinholes 13 and which is imaged, via the beam splitter 15 and the second lens system 16, onto the first detector 17. However, it is not possible to prevent extrafocal sample radiation from passing through the pinholes 13 and thus being incident upon the first detector 17, thereby impairing the confocal imaging. This can occur, for example in the case of thicker samples, if several spots are used simultaneously for illumination. Furthermore, this type of confocal detection is usually optimal only for a particular pupil diameter of the objective 9. Larger or smaller pupil diameters result, disadvantageously, in such extrafocal portions of the sample radiation.

In the case of the light scanning microscope 1 according to the invention, therefore, the beam splitter 8 is provided, which is realized here, for example, such that it reflects 90% of the incident radiation and transmits 10% of the incident radiation.

The extrafocal sample radiation that does not pass through the pinholes 13 is incident upon the side 18 of the second disk 12 that faces towards the first lens system 7, and is reflected on the latter, such that this radiation again passes through the first lens system 7 and a certain proportion of it is transmitted by the beam splitter 8. Arranged behind the beam splitter 8 is a third lens system 19, represented schematically as a lens, and a second detector 20 is arranged downstream of the third lens system 19 The third lens system 19 and the first lens system 7 together form an optical system which images the side 18 of the second disk onto the detector 20. Thus, the extrafocal sample radiation reflected from the side 18 of the second disk 12 is detected with the second detector 20. The light scanning microscope 1 according to the invention thus has an additional detection channel for extrafocal light, which channel can be used, for example, to improve confocal detection.

The light scanning microscope 1 according to the invention additionally comprises a control unit 21, indicated schematically, which is connected at least to both detectors 17 and 20. Further, as represented in FIG. 1, it can also be connected to the light source 2 and to the shaft 14, or to a motor (not shown) that drives the shaft.

If the signal of the first detector 17 is designated as $I_1$ and the signal of the second detector 20 is designated as $I_2$, the signal $I_s$, which designates the desired signal of the confocal section, can be obtained by calculating the following scaled difference $$I_s = I_1 - kI_2,$$

wherein k is a correction constant that takes account of the differing detection efficiencies of the two detection channels (the detection channel with the first detector 17 and the detection channel with the second detector 20).

Thus, both the extrafocal sample light and undesired crosstalk can be reduced considerably, and an excellent confocal section can be achieved.

Further, through scaled addition, the widefield image $I_w$ can be obtained, $$I_w = I_1 + kI_2,$$

wherein, again, k is the correction constant that takes account of the differing detection efficiencies of the two detection channels.

The two detectors 17, 20 can be realized as a row of detectors or a detector array (as indicated schematically in FIG. 1). In particular, they can be formed as CCD, photomultiplier, avalanche photodiode or CMOS detectors.

In the case of the light scanning microscope according to the invention, the two beam splitters 8 and 15 are arranged on the optical axis OA, such that the planar detection region of the first detector 17 can be arranged perpendicular to the optical axis, as represented schematically in FIG. 1. Further, the planar detection region of the second detector 20 is located perpendicular to a notional extension of the optical axis OA, or is located parallel to the pinhole plane. This facilitates adjustment of the detectors in the case of a light scanning microscope according to the invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A Light scanning microscope, comprising:
    an illumination module, which generates several illumination beams and moves them, in each case as a spot, in a predefined region of a sample for the purpose of exciting sample radiation;
    a detector module to confocally detect the sample radiation excited by each spot, the detector module comprising a first detector, an imaging lens system, having an optical axis, for imaging the predefined region along an imaging beam path running from the sample as far as the first detector, and a rotatable diaphragm with several pinholes which are located in a pinhole plane, wherein the diaphragm, upon rotation, is located at least partially in the imaging beam path for confocal detection;
    a second detector disposed outside of the imaging beam path; and a first beam splitter disposed in the imaging beam path between the sample and the diaphragm, wherein the first beam splitter is configured to direct sample radiation, reflected by the diaphragm, onto the second detector.

2. The light scanning microscope according to claim 1, wherein a second beam splitter, which effects beam-path folding of the imaging beam path, is arranged between the diaphragm and the first detector.

3. The light scanning microscope according to claim 2, wherein the diaphragm comprises a constituent part of the illumination module, and the rotation of the diaphragm effects the movement of the spots, wherein the propagation direction of the radiation for generating the illumination beams is perpendicular to the pinhole plane.

4. The light scanning microscope according to claim 3, wherein the illumination module comprises a disk with several imaging elements, the disk is connected to the diaphragm in a rotationally fixed manner, and each imaging element is associated with exactly one pinhole, such that in each case it focuses the illumination beam into the respective associated pinhole.

5. The light scanning microscope according to claim 1, wherein the diaphragm comprises a constituent part of the illumination module, and the rotation of the diaphragm effects the movement of the spots, wherein the propagation direction of the radiation for generating the illumination beams is perpendicular to the pinhole plane.

6. The light scanning microscope according to claim 5, wherein the illumination module comprises a disk with several imaging elements, the disk is connected to the diaphragm in a rotationally fixed manner, and each imaging element is assigned to exactly one pinhole, such that in each case it focuses the illumination beam into the assigned pinhole.

7. The light scanning microscope according to claim 1, wherein the part of the diaphragm which, upon rotation, is arranged at least partially in the imaging beam path is positioned in an intermediate image plane of the imaging lens system.

8. The light scanning microscope according to claim 1, further comprising a detection lens system, which images onto the second detector the part of the diaphragm that is at least partially located in the imaging beam path.

9. The light scanning microscope according to claim 1, wherein the diaphragm comprises a Nipkow disk.

10. The light scanning microscope according to claim 1, wherein the side of the diaphragm that faces towards the first beam splitter is reflective of the sample radiation.

11. The light scanning microscope according to claim 1, further comprising a control unit, to which the signals of the two detectors are supplied, and which takes account of the signals in the generation of a sample image.

12. The light scanning microscope according to claim 11, wherein the control unit is configured to perform a scaled subtraction of the signals of the first and second detectors to determine an optical section of the sample.

13. The light scanning microscope according to claim 12, wherein the control unit is configured to perform a scaled addition of the signals of the first and second detectors to determine a widefield image.

14. The light scanning microscope according to claim 11, wherein the control unit is configured to perform a scaled addition of the signals of the first and second detectors to determine a widefield image.

15. The light scanning microscope according to claim 1, wherein the microscope is configured as a laser scanning microscope.

16. The light scanning microscope according to claim 1, wherein the illumination module, the first beam splitter and the second detector are arranged to lie in a single plane.

17. A microscopy method, comprising:
generating several illumination beams;
moving each illumination beam, as a spot, in a predefined region of a sample, to excite sample radiation;
detecting the sample radiation excited by each spot confocally by a detector module, the detector module comprising a first detector, an imaging lens system for imaging the predefined region along an imaging beam path running from the sample as far as the detector, and a rotatable diaphragm with several pinholes;
rotating the diaphragm such that it is located at least partially in the imaging beam path for the purpose of confocal detection,
disposing a second detector outside of the imaging beam path
disposing a beam splitter in the imaging beam path between the sample and the diaphragm; and
directing with the beam splitter the sample radiation, coming from the diaphragm, onto the second detector.

18. The method of claim 17, further comprising arranging the beam splitter and the second detector coplanar with the illumination beams.

* * * * *